United States Patent
Siomina

(10) Patent No.: US 11,304,208 B2
(45) Date of Patent: Apr. 12, 2022

(54) INTER-FREQUENCY MEASUREMENTS ON FS3 SCELLS

(71) Applicant: Telefonaktiebolaget LM Ericsson (publ), Stockholm (SE)

(72) Inventor: Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 91 days.

(21) Appl. No.: 16/348,562

(22) PCT Filed: Nov. 14, 2017

(86) PCT No.: PCT/IB2017/057110
§ 371 (c)(1),
(2) Date: May 9, 2019

(87) PCT Pub. No.: WO2018/087737
PCT Pub. Date: May 17, 2018

(65) Prior Publication Data
US 2019/0364469 A1    Nov. 28, 2019

Related U.S. Application Data

(60) Provisional application No. 62/421,798, filed on Nov. 14, 2016.

(51) Int. Cl.
*H04L 5/00*     (2006.01)
*H04W 16/14*    (2009.01)
(Continued)

(52) U.S. Cl.
CPC ......... *H04W 72/085* (2013.01); *H04L 5/0048* (2013.01); *H04W 16/14* (2013.01);
(Continued)

(58) Field of Classification Search
CPC .... H04L 5/0048; H04W 16/14; H04W 24/10; H04W 36/0085; H04W 36/06;
(Continued)

(56) References Cited

U.S. PATENT DOCUMENTS

| | | | |
|---|---|---|---|
| 7,936,731 B2 * | 5/2011 | Park ..................... | H04L 1/1867 370/336 |
| 8,369,209 B2 * | 2/2013 | Zhang .................. | H04W 74/08 370/216 |

(Continued)

FOREIGN PATENT DOCUMENTS

| | | |
|---|---|---|
| CN | 103458446 A | 12/2013 |
| IL | 202801 A | 2/2014 |

(Continued)

OTHER PUBLICATIONS

3GPP TSG-RAN WG4 Meeting #80; Gothenburg, Sweden; Title: eLAA RRM requirements; Source to WG: Ericsson; Source to TSG: RAN WG4 (R4-166787, which is a Revision of R4-167161)—Aug. 22-26, 2016.

(Continued)

*Primary Examiner* — Alpus Hsu
(74) *Attorney, Agent, or Firm* — Baker Botts, LLP

(57) ABSTRACT

According to some embodiments, a method in a wireless device of performing at least one intra-frequency radio measurement on at least one carrier frequency f1 in a first set of time resources and at least one inter-frequency radio measurement on at least one carrier frequency f2 in a second set of time resources, wherein at least one of f1 and f2 is operating under a flexible frame structure, comprises: obtaining the first set of time resources associated with the intra-frequency radio measurement; obtaining the second set of time resources associated with the inter-frequency radio measurement; determining a priority of the inter-frequency measurement with respect to the intra-frequency measure- (Continued)

400

412 - indicate whether a wireless device will use measurement gaps to perform an inter-frequency radio measurement 414 - obtain a first set of time resources associated with an intra-frequency radio measurement 416 - obtain a second set of time resources associated with an inter-frequency radio measurement 418 - determine a priority of the inter-frequency measurement with respect to the intra-frequency measurement based on an amount of overlap between the first and the second sets of time resources 420 - perform at least one of the intra-frequency and the inter-frequency measurements using the determined priority 422 - send a result of at least one of the measurements and/or use the result for one or more of the wireless device's operational tasks ment based on an amount of overlap between the first and the second sets of time resources; and performing at least one of the intra-frequency and the inter-frequency measurements using the determined priority.

27 Claims, 7 Drawing Sheets

(51) Int. Cl.
*H04W 24/10* (2009.01)
*H04W 36/00* (2009.01)
*H04W 36/06* (2009.01)
*H04W 36/30* (2009.01)
*H04W 72/04* (2009.01)
*H04W 72/08* (2009.01)
H04W 74/08 (2009.01)

(52) U.S. Cl.
CPC ....... *H04W 24/10* (2013.01); *H04W 36/0085* (2018.08); *H04W 36/06* (2013.01); *H04W 36/30* (2013.01); *H04W 72/0453* (2013.01); H04W 74/0808 (2013.01)

(58) Field of Classification Search
CPC ............. H04W 36/30; H04W 72/0453; H04W 72/085; H04W 74/0808
See application file for complete search history.

(56) References Cited

U.S. PATENT DOCUMENTS

| | | | | |
|---|---|---|---|---|
| 8,644,827 B2* | 2/2014 | Yamada | ............ | H04W 36/0094 455/435.2 |
| 8,837,433 B2* | 9/2014 | Amerga | ................. | H04W 4/06 370/332 |
| 9,125,072 B2* | 9/2015 | Ji | ........................ | H04W 72/085 |
| 9,294,952 B2* | 3/2016 | Siomina | .................. | H04L 5/001 |
| 9,313,039 B2* | 4/2016 | Wu | .......................... | H04W 4/06 |
| 9,467,885 B2* | 10/2016 | Tenny | .................... | H04W 24/10 |
| 9,526,031 B2* | 12/2016 | Siomina | ............... | H04W 24/10 |
| 9,596,042 B2* | 3/2017 | Siomina | ............... | H04B 17/345 |
| 9,603,043 B2* | 3/2017 | Choi | ................. | H04W 72/0446 |
| 9,641,986 B2* | 5/2017 | Shauh | ................... | H04W 24/08 |
| 9,788,227 B2* | 10/2017 | Pragada | ............... | H04W 24/08 |
| 9,848,340 B2* | 12/2017 | Kazmi | ................... | H04W 24/02 |
| 9,877,244 B2* | 1/2018 | Xu | ........................ | H04W 36/04 |
| 2014/0086173 A1 | 3/2014 | Sadeghi | ................... | H04L 5/003 370/329 |
| 2015/0092768 A1* | 4/2015 | Ng | ........................ | H04W 48/16 370/350 |
| 2015/0327286 A1 | 11/2015 | Yiu et al. | | |
| 2016/0057708 A1* | 2/2016 | Siomina | ............ | H04W 72/1263 455/452.2 |
| 2016/0088536 A1* | 3/2016 | Zingler | ............. | H04W 36/0055 455/437 |
| 2016/0205717 A1* | 7/2016 | Kazmi | .................. | H04W 76/15 455/435.2 |
| 2016/0255639 A1* | 9/2016 | Chen | ..................... | H04W 72/02 370/336 |
| 2016/0302114 A1* | 10/2016 | Jain | ........................ | H04W 24/10 |
| 2016/0302230 A1* | 10/2016 | Novlan | ............... | H04L 27/0006 |
| 2016/0337931 A1* | 11/2016 | Wang | .................. | H04W 72/085 |
| 2017/0041773 A1* | 2/2017 | Fujishiro | ............... | H04W 76/14 |
| 2017/0195028 A1* | 7/2017 | Shimezawa | ........... | H04L 1/0026 |
| 2017/0257785 A1* | 9/2017 | Henttonen | ............ | H04L 5/0048 |
| 2018/0049080 A1* | 2/2018 | Zhang | ............... | H04W 36/0088 |
| 2019/0074918 A1* | 3/2019 | Huang | ................ | H04L 27/2666 |

FOREIGN PATENT DOCUMENTS

| | | |
|---|---|---|
| KR | 101520594 B1 | 5/2015 |
| TW | 201507400 A | 2/2015 |
| TW | 1538429 B | 6/2016 |
| TW | 201628361 A | 8/2016 |
| WO | WO2015133825 A1 | 9/2015 |
| WO | 2016 068642 A1 | 5/2016 |
| WO | WO2016068642 A1 | 5/2016 |
| WO | WO2016148530 A1 | 9/2016 |
| WO | WO2016164081 A1 | 10/2016 |

OTHER PUBLICATIONS

3GPP TSG-RAN WG4 Meeting #81; Reno, U.S.A.; Title: Corrections to LAA Measurement Requirements; Source to WG: Qualcomm Incorporated; Source to TSG: R4 (R4-1609811)—Nov. 14-18, 2016.
PCT International Search Report for International application No. PCT/IB2017/057110—dated Feb. 22, 2018.
PCT Written Opinion of the International Searching Authority for International application No. PCT/IB2017/057110—dated Feb. 22, 2018.
Korean Intellectual Property Office, Notice of Preliminary Rejection in Application No. 10-2019-7016717, dated Aug. 11, 2020, 9 pages (translated).
"Inter-frequency measurements in LAA," 3GPP TSG-RAN WG4 Meeting #81, R4-1609810, Nov. 14-18, 2016, Qualcomm Incorporated, 3 pages.
"UE Capabilities and configuration of per CC measurement gaps," 3GPP TSG-RAN WG4 Meeting #79, R4-163463, May 23-27, 2016, Ericsson, 7 pages.
"RRM requirements and scaling," 3GPPTSG-RAN WG4 Meeting #81, R4-1609752, Nov. 14-18, 2016, Nokia, Alcatel-Lucent, Shanghai Bell, 2 pages.
Taiwan Patent Office Official Action in Application No. 106139375, dated Oct. 25, 2018 (translated).
Japan Patent Office Official Action in Application No. 2019-524873, dated Jul. 30, 2020 (translated).
Korean Intellectual Property Office Notice of Preliminary Rejection in Application No. 10-2019-7016717, dated Aug. 11, 2020 (translated).
Intellectual Property India Examination Report in Application No. 201917018031 dated Nov. 26, 2020 (translated).
China Patent Office Official Action in Application No. 201780083322. 9, dated Jan. 29, 2021 (not translated).

* cited by examiner

512 - obtain a wireless device's ability to perform the inter-frequency radio measurement with or without measurement gaps 514 - determine a priority of the inter-frequency measurement with respect to the intra-frequency measurement based on an amount of overlap between the first and the second sets of time resources 516 - based on the determined priority, configure various measurement parameters

INTER-FREQUENCY MEASUREMENTS ON FS3 SCELLS

PRIORITY

This nonprovisional application is a U.S. National Stage Filing under 35 U.S.C. § 371 of International Patent Application Serial No. PCT/IB2017/057110 filed Nov. 14, 2017 and entitled "INTER-FREQUENCY MEASUREMENTS ON FS3 SCELLS" which claims priority to U.S. Provisional Patent Application No. 62/421,798 filed Nov. 14, 2016, both of which are hereby incorporated by reference in their entirety.

TECHNICAL FIELD

Certain embodiments of the present disclosure relate, in general, to wireless communications and, more particularly, to controlling user equipment (UE) operation when configured with inter-frequency measurements on secondary cells (SCells) that use frame structure type three (FS3).

INTRODUCTION

Third Generation Partnership Project (3GPP) Long Term Evolution (LTE) includes multi-carrier operation. In multi-carrier or carrier aggregation (CA) operation, a user equipment (UE) can receive and/or transmit data to more than one serving cell. In other words, a CA capable UE can be configured to operate with more than one serving cell. The carrier of each serving cell is generally referred to as a component carrier (CC). The component carrier (CC) refers to an individual carrier in a multi-carrier system.

The term carrier aggregation (CA) may also be referred to as "multi-carrier system", "multi-cell operation", "multi-carrier operation", "multi-carrier" transmission and/or reception. CA is used for transmission of signaling and data in the uplink and downlink directions. One of the CCs is the primary component carrier (PCC) (also referred to as primary carrier or anchor carrier). The remaining component carriers are referred to as secondary component carrier (SCC) (also referred to as secondary carriers or supplementary carriers). The serving cell is interchangeably referred to as primary cell (PCell) or primary serving cell (PSC). Similarly, the secondary serving cell is interchangeably referred to as secondary cell (SCell) or secondary serving cell (SSC).

Generally, the primary or anchor CC carries the UE specific signaling. The primary CC (i.e., PCC or PCell) exists in both uplink and downlink directions in CA. When there is a single uplink CC, the PCell is on that CC. The network may assign different primary carriers to different UEs operating in the same sector or cell.

In dual connectivity (DC) operation, at least two nodes, referred to as master eNB (MeNB) and secondary eNB (SeNB), may serve the UE. More generally, in multiple connectivity (also referred to as multi-connectivity) operation two or more nodes (e.g., MeNB, SeNB1, SeNB2 and so on) may serve the UE. Both MeNB and SeNB configure the UE with PCC. The PCell from MeNB and SeNB are referred to as PCell and PSCell, respectively. The PCell and PSCell typically operate with the UE independently.

The UE is also configured with one or more SCCs from each of MeNB and SeNB. The corresponding secondary serving cells served by MeNB and SeNB are referred to as SCell. The UE in DC typically has separate TX/RX for each of the connections with MeNB and SeNB. Thus, the MeNB and SeNB may independently configure the UE with one or more procedures (e.g., radio link monitoring (RLM), DRX cycle, etc.) on their PCell and PSCell, respectively.

A multi-carrier system may include carriers in licensed and/or unlicensed spectrum.

A LTE UE may perform inter-frequency measurements using measurement gaps. Inter-frequency measurements in LTE are conducted during periodic inter-frequency measurement gaps which are configured in such a way that each gap starts at a system frame number (SFN) and subframe meeting the following conditions: SFN mod T=FLOOR(gapOffset/10); subframe=gapOffset mod 10; with T=MGRP/10. MGRP stands for "measurement gap repetition period."

E-UTRAN provides a single measurement gap pattern with constant gap duration for concurrent monitoring of all frequency layers and radio access technologies (RATs). Two configurations are supported by the UE, with MGRP of 40 and 80 ms, both with the measurement gap length of 6 ms. In practice, the switching time leaves less than 6, but at least 5, full subframes for measurements within each such measurement gap.

In LTE, measurement gaps are configured by the network to enable measurements on the other LTE frequencies and/or other RATs. The gap configuration is signaled to the UE over radio resource control (RRC) protocol as part of the measurement configuration. The gaps are common (i.e., shared by) for all frequencies, but the UE can measure only one frequency at a time within each gap.

License assisted access (LAA), or operation based on frame structure type 3 (frame structure type 3 is specified in 3GPP TS 36.211), which was introduced in LTE Rel-13, refers to UE operation on at least one carrier in unlicensed spectrum, such as Band 46, also used for WiFi access. For example, a UE may be configured with carrier aggregation with PCell in Band 1 (licensed spectrum) and SCell in Band 46 (unlicensed spectrum). An eNB operating in the unlicensed band only transmits signals which may be used for UE measurements using discovery reference symbols (DRS). Unlike release 8 CRS (common reference symbols), DRS is not transmitted in every subframe, and is instead transmitted periodically (e.g., every 160 ms). Moreover, the eNB may perform listen before talk (LBT) procedures to check that no other node (such as another eNB or a WiFi access point) is transmitting in the unlicensed spectrum before it transmits DRS. From a UE perspective, the eNB may be unable to transmit any particular DRS transmission. In certain regions, LBT functionality is required from a regulatory point of view to ensure fair coexistence of different radios and access technologies on the unlicensed band.

LTE Rel-14, in addition to the downlink operation in the unlicensed spectrum as described above, includes uplink operation. A UE may be configured with uplink transmissions on one or more SCells in the unlicensed spectrum and perform uplink LBT if needed.

According to the LBT procedure, the transmitter in unlicensed spectrum (e.g., base station for downlink or the user terminal for uplink) needs to listen on the carrier before it starts to transmit. If the medium is free, then the transmitter can transmit (also referred to as LBT success). If the medium is busy (e.g., some other node is transmitting), then the transmitter cannot transmit (also referred to as LBT unsuccessful or fail). The transmitter can try again at a later time.

Therefore, the LBT procedure enables a clear channel assessment (CCA) check before using the channel. Based on the CCA, if the channel is found to be clear, then LBT is considered to be successful. But if the channel is found to be occupied, then the LBT is considered to be a failure, also referred to as LBT failure. The LBT failure requires the network node not to transmit signals in the same and/or subsequent subframes. Exact subframes and also the number of subframes where transmission is forbidden depend on the specific design of the LBT scheme.

LBT may delay a transmission in an unlicensed band until the medium becomes free again. When transmitting nodes do not coordinate between themselves (which is a common scenario), the delay may appear random.

In the simplest form, LBT is performed periodically with a period equal to certain units of time (e.g., one unit of time duration such as 1 transmission time interval (TTI), 1 time slot, 1 subframe, etc.). The duration of listening in LBT is typically in the order of few to tens of μsec. Typically, for LBT purpose, each LTE subframe is divided in two parts. Listening takes place in the first part, and the second part carries data if the channel is sensed to be free. The listening occurs at the beginning of the current subframe and determines whether or not data transmission will continue in the current subframe and a few successive subframes. Thus, the data transmission in a subframe P until subframe P+n is determined by the outcome of listening during the beginning of subframe P. The number n depends on system design and/or regulatory requirements.

FIG. 1 illustrates an example listen-before-talk (LBT) procedure in long term evolution (LTE). The horizontal axis represents time. The procedure includes an example sequence of different stages related to the LBT procedure performed by the UE (i.e., to enable uplink transmission), where "s" is the sensing time period. If the channel is determined to be busy, after some deferral time, the UE may try again to sense on the channel to determine whether the channel is available. If the channel is available, after some backoff time the UE may start transmitting an uplink burst (during the UE's channel occupancy time) but for no longer than the maximum channel occupancy time (MCOT), which can be, for example, up to 10 ms, depending on the region.

According to 3GPP TS 36.211, for a carrier operated under FS3, all 10 subframes within a radio frame are available for downlink transmissions. However, some subframes may be dynamically indicated for UE uplink transmissions (e.g., via physical layer control signaling, such as control channel).

Currently, the measurement period (i.e., the time needed to perform one or more measurements) depends only on (1) the time needed to complete the measurement as if the downlink transmissions used for the measurement are always available and (2) the time or the number of downlink instances that would be measured but are not transmitted by the network due to downlink LBT. However, for (2), the UE still needs to spend some effort to detect whether the downlink signals are available.

In LAA, measurements are performed in DRS occasions which are 1 subframe long. If the UE is not able to receive in downlink during a DRS occasion, then the next opportunity may only be in the next DRS occasion (e.g., after 40 ms). This is unlike time division duplex (TDD), which is a more deterministic scheme where each radio frame always includes at least two downlink subframes and the downlink signals are always available. Thus, the UE is able to meet the same measurement time requirement in TDD as in frequency division duplex (FDD).

The following inter-frequency measurements are currently specified for LAA/eLAA (e.g., in 36.214 and 36.133): (a) inter-frequency CRS-based measurements and cell identification on FS3 cells; (b) inter-frequency CSI-RS-based measurements and transmission point (TP) identification on FS3 cells (for distributed antenna systems and shared cell scenarios—see more below); (c) inter-frequency RSSI measurements on FS3 carriers; and (d) channel occupancy measurements on FS3 carriers.

The following CA measurements are specified for LAA/eLAA: (a) measurements on SCCs with active SCell operating under FS3; and (b) measurements on SCCs with deactivated SCell operating under FS3 (these measurements are performed based on the parameter measCycleSCell defined in TS 36.331 which is signaled by eNB via RRC).

Some networks include distributed antenna systems (DAS). Typically a DAS is a network where multiple spatially separated antenna nodes are connected to a common source. A distributed antenna system may be deployed indoors or outdoors. Herein, a DAS system may be any system using, for example, remote radio heads (RRHs), remote radio units (RRUs), or even small base stations, or more generally any transmission points (TPs) connected to a common source, etc. The common source may be, for example, a base station. Herein, a DAS is understood in a broad sense so that a shared cell deployment (where multiple TPs belong to the same shared cell) or coordinated multi-point (CoMP) deployment are also considered special cases of DAS. In a further example, a common source can be used for multiple TPs deployed indoors and provide radio signal transmissions for a multi-floor building where each floor can be served by one or more of such TPs.

A shared cell is a type of downlink CoMP where multiple geographically separated transmission points dynamically coordinate their transmission towards the UE. A unique feature of shared cell is that all transmission points within the shared cell have the same physical cell ID (PCI). Thus, a UE cannot distinguish between the TPs by PCI decoding. The PCI is acquired during a measurement procedure (e.g., cell identification, etc.). A TP may comprise one or more antenna ports. The TP can be uniquely identified by a unique identifier referred to as a TP ID.

The shared cell approach can be implemented by distributing the same cell specific signals on all points (within the macro point coverage area). With such a strategy, the same physical signals, such as primary synchronization signals (PSS), secondary synchronization signals (SSS), cell specific reference signals (CRS), positioning reference signal (PRS), etc., and the same physical channels, such as physical broadcast channel (PBCH), physical downlink shared channel (PDSCH) containing paging and system information blocks (SIBs), control channels (PDCCH, PCFICH, PHICH) etc., are transmitted from each TP in the downlink. Tight synchronization in terms of transmission timings between the TPs within a shared cell is used (e.g., on the order of ±100 ns between any pair of nodes). This enables the physical signals and channels transmitted from M points to be combined over air. The combining is similar to what is encountered in single-frequency networks (SFN) for broadcast.

Each TP may also be configured to transmit CSI-RS signals which are unique to each TP. Therefore, the CSI-RS enables the UE to uniquely identify a TP within a shared cell. The UE may also use the CSI-RS for performing measurement (e.g., CSI-RSRP), which enables the UE to determine the strongest TP within a shared cell.

FIG. 2 is an example shared cell with one macro node and several remote radio heads (RRH) all sharing the same cell ID (i.e., physical cell identifier (PCI)). Macro node 120 is communicably coupled to three RRH 140. Macro node 120 and RRH 140 all transmit cell-id 1 to wireless devices 110.

A problem with these existing solutions is that a UE configured with measurement gaps for performing inter-frequency LAA measurements may not be able to meet the currently specified requirements. For example, the UE may not be able to meet specified requirements for these inter-frequency measurements and/or the requirements for LAA measurements performed on SCCs (serving or neighbor cells), when measurement gaps overlap with DMTC occasions on SCCs.

SUMMARY

The embodiments described herein include several methods in a user equipment (UE) and a network node. In general, a method (and corresponding apparatus and software) in a wireless device, such as a UE, configured to perform at least one first radio measurement on at least one serving carrier frequency f1 and at least one second radio measurement on at least one non-serving carrier frequency f2, wherein at least one of f1 and f2 is operating under a flexible frame structure (e.g., FS3), may comprise the following steps. Step-1: Indicating to another node (e.g., a network node, eNodeB, or positioning node), the wireless device's ability to perform the second radio measurement without measurement gaps or the wireless device's need for the measurement gaps. Step-2: Obtaining a first set of time resources associated with the first radio measurement. The first set of time resources may comprise periodic time resources, such as periodic discovery reference signal (DRS) measurement timing configuration (DMTC) occasions (e.g., with 40 ms, 80 ms, or 160 ms periodicity) on f1 in a first cell. Step-3: Obtaining a second set of time resources associated with the second radio measurement. The second set of time resources may comprise periodic time resources, such as periodic DMTC occasions (e.g., with 40 ms, 80 ms, or 160 ms periodicity) on f2 in a second cell and/or time resources with measurement gaps. Step-4: Determining a priority of the second measurement with respect to the first measurement. Step-5: Based on the determined priority, performing at least one of the first and the second measurements. In some embodiments, performing at least one of the first and the second measurements may further comprise determining one or more performance metrics/targets/requirements associated with the first and/or the second measurements. Step-6: Sending, to another wireless device or a network node, a result of the first and/or second measurements and/or using the result for one or more of the wireless device's operational tasks.

In general, a method in a network node may comprise the following steps. Step-1: Obtaining a wireless device's ability to perform the second radio measurement without measurement gaps or the wireless device's need for the measurement gaps. Step-2: Determining a priority of the second measurement with respect to the first measurement. Step 3: Based on the determined priority, performing at least one of: (a) determining of one or more performance metrics/targets/requirements associated with the first and/or the second measurements; (b) using the determined one or more performance metrics/targets/requirements associated with the first and/or the second measurements for receiving measurement results; (c) adapting the first and/or second measurement configuration; (d) adapting DMTC configuration on f1; (e) adapting DMTC configuration on f2; (f) adapting received signal strength indicator (RSSI) measurement timing configuration (RMTC) configuration on f1; (g) adapting RMTC configuration on f2; (h) adapting measurement reporting configuration (e.g., reporting periodicity); (i) adapting the receiving at the network node (e.g., adapting to the adapted reporting interval, relaxed measurement time, etc.); or (j) sending to the radio node at least one parameter adapted according to the above (e.g., adapted DMTC configuration or measurement reporting configuration).

According to some embodiments, a method in a wireless device of performing at least one intra-frequency radio measurement on at least one carrier frequency f1 in a first set of time resources and at least one inter-frequency radio measurement on at least one carrier frequency f2 in a second set of time resources, wherein at least one of f1 and f2 is operating under a flexible frame structure, comprises: obtaining the first set of time resources associated with the intra-frequency radio measurement; obtaining the second set of time resources associated with the inter-frequency radio measurement; determining a priority of the inter-frequency measurement with respect to the intra-frequency measurement based on an amount of overlap between the first and the second sets of time resources; and performing at least one of the intra-frequency and the inter-frequency measurements using the determined priority.

In particular embodiments, the method further comprises sending, to another wireless device or a network node, a result of at least one of the intra-frequency and the inter-frequency measurements. The method may indicate to another wireless device or network node whether the wireless device will use measurement gaps to perform the inter-frequency radio measurement.

In particular embodiments, the second set of time resources includes measurement gaps. At least one of the first set of time resources and the second set of time resources may be associated with a DMTC or a RMTC.

In particular embodiments, determining the priority comprises determining a first priority when the amount of overlap is below a threshold, and determining a second priority when the amount of overlap is equal to or greater than the threshold. Determining the priority may comprise using a first function for determining an amount of time for performing at least one of the intra-frequency measurement and the inter-frequency measurement when there is no overlap between the first and the second sets of time resources, and using a second function for determining the amount of time when the second set of time resources at least partially overlaps with the first set of time resources. Determining the priority may comprise using a third function for determining the amount of time when the second set of time resources completely overlaps the first set of time resources. The determined priority of the inter-frequency measurement is lower than a priority of the intra-frequency measurement.

In particular embodiments, performing at least one of the intra-frequency and the inter-frequency measurements using the determined priority comprises not performing the lower priority measurement in an overlapping time resource. Performing at least one of the intra-frequency and the inter-frequency measurements using the determined priority may comprise scaling an amount of time for performing at least one of the intra-frequency and the inter-frequency measurements. Scaling the amount of time may comprise extending an amount of time for performing the lower priority measurement. Scaling the amount of time may comprise scaling with a different scaling factor depending on the amount of overlap between the first and second sets of time resources. Scaling the amount of time may comprise extending the intra-frequency measurement period when there is overlap between the first and second sets of time resources and not extending the intra-frequency measurement period when there is not overlap between the first and second sets of time resources.

In particular embodiments, the inter-frequency measurement comprises a measurement that is performed in a measurement gap or a measurement based on DMTC or RMTC occasions on a secondary carrier component operating under the flexible frame structure.

According to some embodiments, a wireless device is capable of performing at least one intra-frequency radio measurement on at least one carrier frequency f1 in a first set of time resources and at least one inter-frequency radio measurement on at least one carrier frequency f2 in a second set of time resources. At least one of f1 and f2 is operating under a flexible frame structure. The wireless device comprises processing circuitry operable to: obtain the first set of time resources associated with the intra-frequency radio measurement; obtain the second set of time resources associated with the inter-frequency radio measurement; determine a priority of the inter-frequency measurement with respect to the intra-frequency measurement based on an amount of overlap between the first and the second sets of time resources; and perform at least one of the intra-frequency and the inter-frequency measurements using the determined priority.

In particular embodiments, the processing circuitry is further operable to send, to another wireless device or a network node, a result of at least one of the intra-frequency and the inter-frequency measurements. The processing circuitry may be further operable to indicate to another wireless device or network node whether the wireless device will use measurement gaps to perform the inter-frequency radio measurement.

In particular embodiments, the second set of time resources includes measurement gaps. At least one of the first set of time resources and the second set of time resources may be associated with a DMTC or a RMTC.

In particular embodiments, the processing circuitry is operable to determine the priority by determining a first priority when the amount of overlap is below a threshold, and determining a second priority when the amount of overlap is equal to or greater than the threshold. The processing circuitry may be operable to determine the priority by using a first function for determining an amount of time for performing at least one of the intra-frequency measurement and the inter-frequency measurement when there is no overlap between the first and the second sets of time resources, and using a second function for determining the amount of time when the second set of time resources at least partially overlaps with the first set of time resources. The processing circuitry may be operable to determine the priority by using a third function for determining the amount of time when the second set of time resources completely overlaps the first set of time resources. The determined priority of the inter-frequency measurement is lower than a priority of the intra-frequency measurement.

In particular embodiments, the processing circuitry is operable to perform at least one of the intra-frequency and the inter-frequency measurements using the determined priority by not performing the lower priority measurement in an overlapping time resource. The processing circuitry may be operable to perform at least one of the intra-frequency and the inter-frequency measurements using the determined priority by scaling an amount of time for performing at least one of the intra-frequency and the inter-frequency measurements. Scaling the amount of time may comprise extending an amount of time for performing the lower priority measurement. Scaling the amount of time may comprise scaling with a different scaling factor depending on the amount of overlap between the first and second sets of time resources. Scaling the amount of time may comprise extending the intra-frequency measurement period when there is overlap between the first and second sets of time resources and not extending the intra-frequency measurement period when there is not overlap between the first and second sets of time resources.

In particular embodiments, the inter-frequency measurement comprises a measurement that is performed in a measurement gap or a measurement based on DMTC or RMTC occasions on a secondary carrier component operating under the flexible frame structure.

According to some embodiments, a network node is capable of operating in a network with a wireless device operable to perform at least one intra-frequency radio measurement on at least one carrier frequency f1 in a first set of time resources and at least one inter-frequency radio measurement on at least one carrier frequency f2 in a second set of time resources. At least one of f1 and f2 is operating under a flexible frame structure. A method in the network node comprises: determining a priority of the inter-frequency measurement with respect to the intra-frequency measurement based on an amount of overlap between the first and the second sets of time resources; and performing a measurement configuration using the determined priority.

In particular embodiments, the method further comprises obtaining an ability of the wireless device to perform the inter-frequency radio measurement with or without measurement gaps.

In particular embodiments, determining the priority comprises determining a first priority when the amount of overlap is below a threshold, and determining a second priority when the amount of overlap is equal to or greater than the threshold. Determining the priority may comprise using a first function for determining an amount of time for performing at least one of the intra-frequency measurement and the inter-frequency measurement when there is no overlap between the first and the second sets of time resources, and using a second function for determining the amount of time when the second set of time resources at least partially overlaps with the first set of time resources. Determining the priority may comprise using a third function for determining the amount of time when the second set of time resources completely overlaps the first set of time resources. The determined priority of the inter-frequency measurement is lower than a priority of the intra-frequency measurement.

In particular embodiments, at least one of the first set of time resources and the second set of time resources includes a DMTC or a RMTC. Performing the measurement configuration comprises adapting at least one of the DMTC or RMTC based on the determined priority.

In particular embodiments, performing the measurement configuration comprises scaling an amount of time for performing at least one of the intra-frequency and the inter-frequency measurements. Scaling the amount of time may comprise extending an amount of time for performing the lower priority measurement. Scaling the amount of time may comprise scaling with a different scaling factor depending on the amount of overlap between the first and second sets of time resources. Scaling the amount of time may comprise extending the intra-frequency measurement period when there is overlap between the first and second sets of time resources and not extending the intra-frequency measurement period when there is not overlap between the first and second sets of time resources.

In particular embodiments, the inter-frequency measurement comprises a measurement that is performed in a measurement gap or a measurement based on DMTC or RMTC occasions on a secondary carrier component operating under the flexible frame structure.

According to some embodiments, a network node is capable of operating in a network with a wireless device operable to perform at least one intra-frequency radio measurement on at least one carrier frequency f1 in a first set of time resources and at least one inter-frequency radio measurement on at least one carrier frequency f2 in a second set of time resources. At least one of f1 and f2 is operating under a flexible frame structure. The network node comprising processing circuitry operable to: determine a priority of the inter-frequency measurement with respect to the intra-frequency measurement based on an amount of overlap between the first and the second sets of time resources; and perform a measurement configuration using the determined priority.

In particular embodiments, the processing circuitry is further operable to obtain an ability of the wireless device to perform the inter-frequency radio measurement with or without measurement gaps.

In particular embodiments, the processing circuitry is operable to determine the priority by determining a first priority when the amount of overlap is below a threshold, and determining a second priority when the amount of overlap is equal to or greater than the threshold. The processing circuitry may be operable to determine the priority by using a first function for determining an amount of time for performing at least one of the intra-frequency measurement and the inter-frequency measurement when there is no overlap between the first and the second sets of time resources, and using a second function for determining the amount of time when the second set of time resources at least partially overlaps with the first set of time resources. The processing circuitry may be operable to determine the priority by using a third function for determining the amount of time when the second set of time resources completely overlaps the first set of time resources. The determined priority of the inter-frequency measurement is lower than a priority of the intra-frequency measurement.

In particular embodiments, at least one of the first set of time resources and the second set of time resources includes a DMTC or a RMTC. The processing circuitry is operable to perform the measurement configuration by adapting at least one of the DMTC or RMTC based on the determined priority.

In particular embodiments, the processing circuitry is operable to perform the measurement configuration by scaling an amount of time for performing at least one of the intra-frequency and the inter-frequency measurements. Scaling the amount of time may comprise extending an amount of time for performing the lower priority measurement. Scaling the amount of time may comprise scaling with a different scaling factor depending on the amount of overlap between the first and second sets of time resources. Scaling the amount of time may comprise extending the intra-frequency measurement period when there is overlap between the first and second sets of time resources and not extending the intra-frequency measurement period when there is not overlap between the first and second sets of time resources.

In particular embodiments, the inter-frequency measurement comprises a measurement that is performed in a measurement gap or a measurement based on DMTC or RMTC occasions on a secondary carrier component operating under the flexible frame structure.

According to some embodiments, a wireless device is capable of performing at least one intra-frequency radio measurement on at least one carrier frequency f1 in a first set of time resources and at least one inter-frequency radio measurement on at least one carrier frequency f2 in a second set of time resources. At least one of f1 and f2 is operating under a flexible frame structure. The wireless device comprises an obtaining module, a determining module, and a measuring module. The obtaining module is operable to obtain the first set of time resources associated with the intra-frequency radio measurement, and obtain the second set of time resources associated with the inter-frequency radio measurement. The determining module is operable to determine a priority of the inter-frequency measurement with respect to the intra-frequency measurement based on an amount of overlap between the first and the second sets of time resources. The measuring module is operable to perform at least one of the intra-frequency and the inter-frequency measurements using the determined priority.

According to some embodiments, a network node is capable of operating in a network with a wireless device operable to perform at least one intra-frequency radio measurement on at least one carrier frequency f1 in a first set of time resources and at least one inter-frequency radio measurement on at least one carrier frequency f2 in a second set of time resources. At least one of f1 and f2 is operating under a flexible frame structure. The network node comprises a determining module and a configuring module. The determining module is operable to determine a priority of the inter-frequency measurement with respect to the intra-frequency measurement based on an amount of overlap between the first and the second sets of time resources. The configuring module is operable to perform a measurement configuration using the determined priority.

Also disclosed is a computer program product. The computer program product comprises instructions stored on non-transient computer-readable media which, when executed by a processor, perform the steps of obtaining the second set of time resources associated with the inter-frequency radio measurement; determining a priority of the inter-frequency measurement with respect to the intra-frequency measurement based on an amount of overlap between the first and the second sets of time resources; and performing at least one of the intra-frequency and the inter-frequency measurements using the determined priority.

Another computer program product comprises instructions stored on non-transient computer-readable media which, when executed by a processor, perform the steps of determining a priority of the inter-frequency measurement with respect to the intra-frequency measurement based on an amount of overlap between the first and the second sets of time resources; and performing a measurement configuration using the determined priority.

Certain embodiments of the present disclosure may provide one or more technical advantages. As an example, a particular advantage of some embodiments is that the UE may perform inter-frequency measurements and meet the timing requirements for performing the measurements. Other advantages will be apparent to persons of ordinary skill in the art.

BRIEF DESCRIPTION OF THE DRAWINGS

For a more complete understanding of the embodiments and their features and advantages, reference is now made to the following description, taken in conjunction with the accompanying drawings, in which:

FIG. 5 is a flow diagram of an example method in a network node, according to some embodiments;

DETAILED DESCRIPTION

Figure 1:
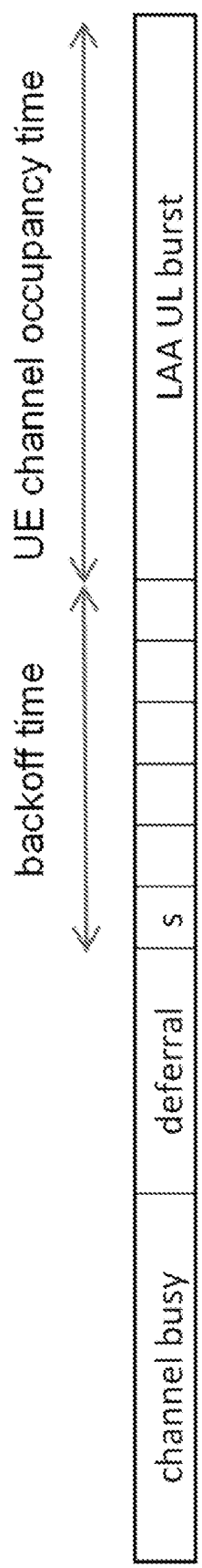
FIG. 1 illustrates an example listen-before-talk (LBT) procedure in long term evolution (LTE)

Third Generation Partnership Project (3GPP) Long Term Evolution (LTE) includes multi-carrier operation. In multi-carrier operation, a user equipment (UE) can receive and/or transmit data to more than one serving cell and sometimes more than one frequency. A multi-carrier system may include carriers in licensed and/or unlicensed spectrum. A LTE UE may perform inter-frequency measurements using measurement gaps. A particular problem is that a UE configured with measurement gaps for performing inter-frequency license assisted access (LAA) measurements may not be able to meet the currently specified requirements for performing measurements. For example, the UE may not be able to meet specified requirements for these inter-frequency measurements and/or the requirements for LAA measurements performed on secondary component carriers (SCCs) (serving or neighbor cells), when measurement gaps overlap with discovery measurement timing configuration (DMTC) occasions on SCCs.

Particular embodiments obviate the problems described above and include determining an amount of overlap between timing resources used to perform measurements on two more carrier frequencies. Based on the amount of overlap, a UE may prioritize measurements on one frequency or another. Prioritizing measurements may refer to performing measurements on one frequency according to specified time requirements or signal quality, while performing lower priority measurements according to more relaxed requirements than normal (i.e., no overlap).

Any two or more embodiments described herein may be combined in any way with each other. Furthermore, even though the examples herein are given in the LAA context, the embodiments described herein are not limited to LAA. The described embodiments are not limited to LTE either, but can be adapted in other radio access technologies (RATs), such as UTRA, LTE-Advanced, 5G, NX, NB-IoT, WiFi, BlueTooth, etc.

The embodiments described herein may apply, for example, to a general single-carrier or multi-carrier/carrier aggregation deployments with at least one carrier in unlicensed spectrum or based on frame structure type 3 (FS3), deployment with dual-connectivity, deployment with multi-connectivity, standalone or non-standalone LAA/eLAA operation, etc.

Some embodiments use the non-limiting term "UE." A UE may refer to any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, tablet, mobile terminals, smart phone, laptop embedded equipped (LEE), laptop mounted equipment (LME), USB dongles, Customer Premises Equipment (CPE), etc. The UE may also be referred to as a wireless device.

Some embodiments use the non-limiting term "network node." A network node may refer to any kind of network node which may comprise of a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., mobility management entity (MME), self-optimizing network (SON) node, a coordinating node, positioning node (e.g., SMLC, E-SMLC, etc.), MDT node, etc.), or even an external node (e.g., 3rd party node, a node external to the current network), etc.

Some embodiments may use the generic terminology Primary Serving Cell (PCell), Primary Secondary Cell (PSCell) and Secondary (Serving) Cell (SCell). These terms may refer to different types of serving cells which a certain UE is configured to use. Other terms which may be used for these terms are Primary Component Carrier (PCC), Primary Secondary Component Carrier (PSCC), and Secondary Component Carrier (SCC), respectively.

The term "radio node" may refer to a UE or a radio network node.

The term "signaling" may refer to any of: high-layer signaling (e.g., via RRC), lower-layer signaling (e.g., via a physical control channel or a broadcast channel), or a combination thereof. Signaling may be implicit or explicit. Signaling may further be unicast, multicast or broadcast. Signaling may also be directly to another node or via a third node.

The term discovery reference signal (DRS) or discover (or discovery) signal may refer to any type of reference signal that a UE may use for performing one or more measurements. Examples of DRS include cell-specific reference signal (CRS), channel state indicator-reference signal (CSI-RS), primary synchronization signal (PSS), secondary synchronization signal (SSS), multicast-broadcast single-frequency network (MBSFN) reference signal, etc. One or more DRS may be transmitted in the same DRS time resource. Examples of a DRS time resource include symbol, subframe, slot, transmission time interval, etc.

The term "radio measurement" herein refers to radio measurements. Some examples of radio measurements include: DRS or discovery signal measurement, received signal strength indicator RSSI measurement, channel occupancy measurement, WiFi RSSI measurement, signal strength or signal power measurements (e.g., reference signal received power (RSRP) or CSI-RSRP), signal quality measurements (e.g., reference signal received quality (RSRQ), signal to interference and noise ratio (SINR)), timing measurements (e.g., UE Rx-Tx time difference, BS Rx-Tx time difference, timing advance, RSTD, RTT, TOA), radio link monitoring measurements (RLM), CSI, PMI, cell detection, cell identification, number of successful reports, number of ACKs/NACKs, failure rate, error rate, correct system information reading, etc. The measurements may be absolute or relative (e.g., absolute RSRP and relative RSRP). The measurements may be performed for one or more different purpose, e.g., RRM, SON, positioning, MDT, etc. The measurements may be, e.g., intra-frequency measurements, inter-frequency measurements, or CA measurements. The measurements may be performed in the licensed and/or unlicensed spectrum. The measurements or measurement reporting may be single measurements, periodic or aperiodic, event-triggered, logged measurements, etc. The measurements may be unidirectional, e.g., downlink measurement, uplink measurements, or bidirectional, e.g., Rx-Tx or RTT.

The term "radio signal" may refer, for example, to one or more of: reference signal (e.g., CRS, CSI-RS, MBSFN RS, positioning reference signal (PRS), cell-specific reference signal, UE-specific reference signal, CSI-RS), synchronization signal (e.g., PSS, SSS, etc.), radio channel (e.g., control channel, broadcast or multicast channel, etc.), discovery or DRS signal, etc. Radio signal may also be referred to as a wireless signal.

The term LBT may correspond to any type of CSMA procedure or mechanism which is performed by the node on a carrier before deciding to transmit signals on that carrier. CSMA or LBT may also interchangeably be referred to as clear channel assessment, clear channel determination, etc. LBT may be performed by any radio node (e.g., by the UE or by the radio network node).

The term time resource may correspond to any type of physical resource or radio resource expressed in terms of length of time. Examples of time resources include: symbol, time slot, subframe, radio frame, TTI, interleaving time, etc.

The term "flexible frame structure" may refer to, for example, FS3 structure as defined in 3GPP TS 36.211. It may also be any frame structure where any resource is by default a downlink resource, unless indicated otherwise. With a flexible frame structure, radio nodes may need to perform a channel access procedure (e.g., CSMA) to be able to transmit.

Particular embodiments are described with reference to FIGS. 4-7B of the drawings, like numerals being used for like and corresponding parts of the various drawings. LTE and NR are used throughout this disclosure as example cellular systems, but the ideas presented herein may apply to other wireless communication systems as well.

Figure 2:
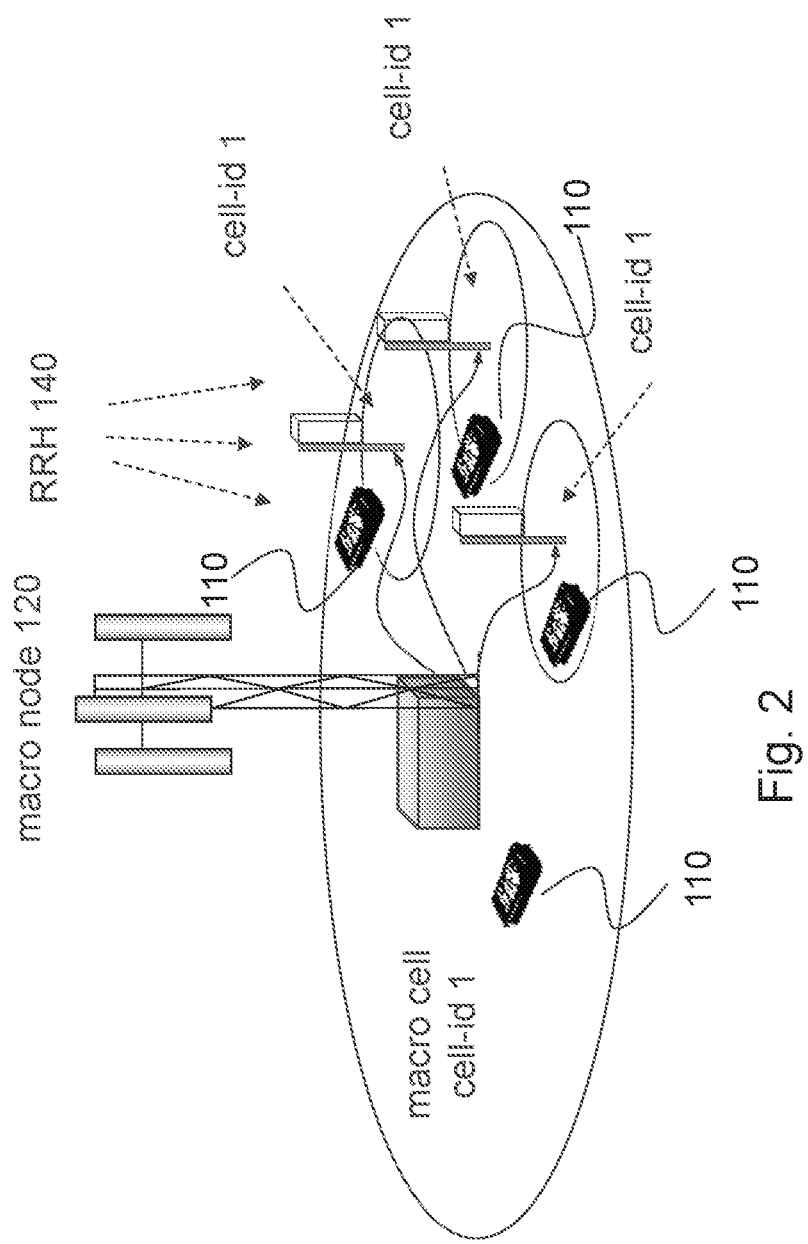
FIG. 2 is an example shared cell with one macro node and several remote radio heads (RRH) all sharing the same cell ID (i.e., physical cell identifier (PCI))
Figure 3:
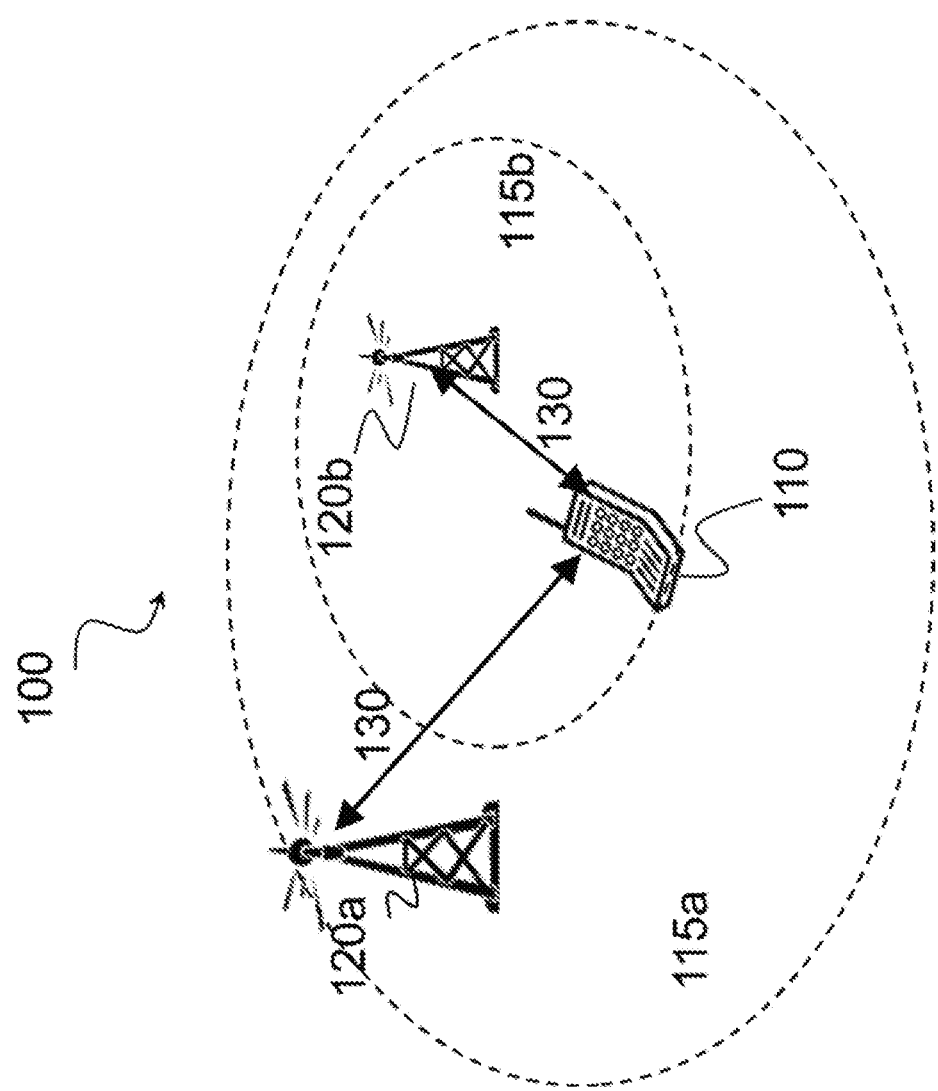
FIG. 3 illustrates an example wireless network, according to a particular embodiment.

FIG. 3 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115). In some embodiments, network node 120 and wireless devices 110 may perform similar functions a macro node 120 and wireless devices 110, respectively, described with respect to FIG. 2.

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120). Wireless signals 130 may be transmitted according to a particular numerology (e.g., radio frame duration, subframe or TTI duration, slot duration, symbols per slot and subframe, subcarrier spacing, sampling frequency, FFT size, subcarriers per resource block, cyclic prefix, etc.).

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Network 100 may include carrier aggregation. For example, wireless device 110 may be served by both network node 120a and 120b and communicate wireless signals 130 with both network node 120a and 120b.

In some embodiments, wireless device 110 is configured to perform at least one first radio measurement on at least one carrier frequency f1 and at least one second radio measurement on at least one other carrier frequency f2. At least one of f1 and f2 is operating under a flexible frame structure (e.g., FS3).

In some embodiments, wireless device 110 indicates to another node, such as network node 120 or another wireless device 110, the ability of wireless device 110 to perform a measurement with or without measurement gaps. Wireless device 110 may obtain a first set of time resources associated with the first radio measurement. The first set of time resources may comprise periodic time resources, such as periodic DMTC occasions (e.g., with 40 ms, 80 ms, or 160 ms periodicity) on f1 in a first cell. Wireless device 110 may obtain a second set of time resources associated with the second radio measurement. The second set of time resources may comprise periodic time resources, such as periodic DMTC occasions (e.g., with 40 ms, 80 ms, or 160 ms periodicity) on f2 in a second cell and/or time resources with measurement gaps. Wireless device 110 may determine a priority of the second measurement with respect to the first measurement (e.g., based on an amount of overlap between the two sets of time resources) and, based on the determined priority, perform at least one of the first and the second measurements. In some embodiments, performing at least one of the first and the second measurements may further comprise determining of one or more performance metrics/targets/requirements associated with the first and/or the second measurements. Wireless device 110 may send, to another wireless device 110 or network node 120, a result of the first and/or second measurements. In some embodiments, wireless device 110 may use the result for one or more operational tasks.

In some embodiments, network node 120 may obtain an ability of wireless device 110 to perform a measurement with or without measurement gaps. Network node 120 may determine a priority of the second measurement with respect to the first measurement (e.g., based on amount of overlap between time resources associated with each measurement). Based on the determined priority, network node 120 may perform at least one of: (a) determining of one or more performance metrics/targets/requirements associated with the first and/or the second measurements; (b) using the determined one or more performance metrics/targets/requirements associated with the first and/or the second measurements for receiving measurement results; (c) adapting the first and/or second measurement configuration; (d) adapting DMTC configuration on f1; (e) adapting DMTC configuration on f2; (f) adapting RMTC configuration on f1; (g) adapting RMTC configuration on f2; (h) adapting measurement reporting configuration (e.g., reporting periodicity); (i) adapting the receiving at the network node (e.g., adapting to the adapted reporting interval, relaxed measurement time, etc.); or (j) sending to the radio node at least one parameter adapted according to the above (e.g., adapted DMTC configuration or measurement reporting configuration).

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

In wireless network 100, each radio network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 6A. Similarly, a network node may include any suitable combination of hardware and/or software. For example, in particular embodiments, a network node, such as network node 120, may include the components described below with respect to FIG. 7A.

Figure 4:
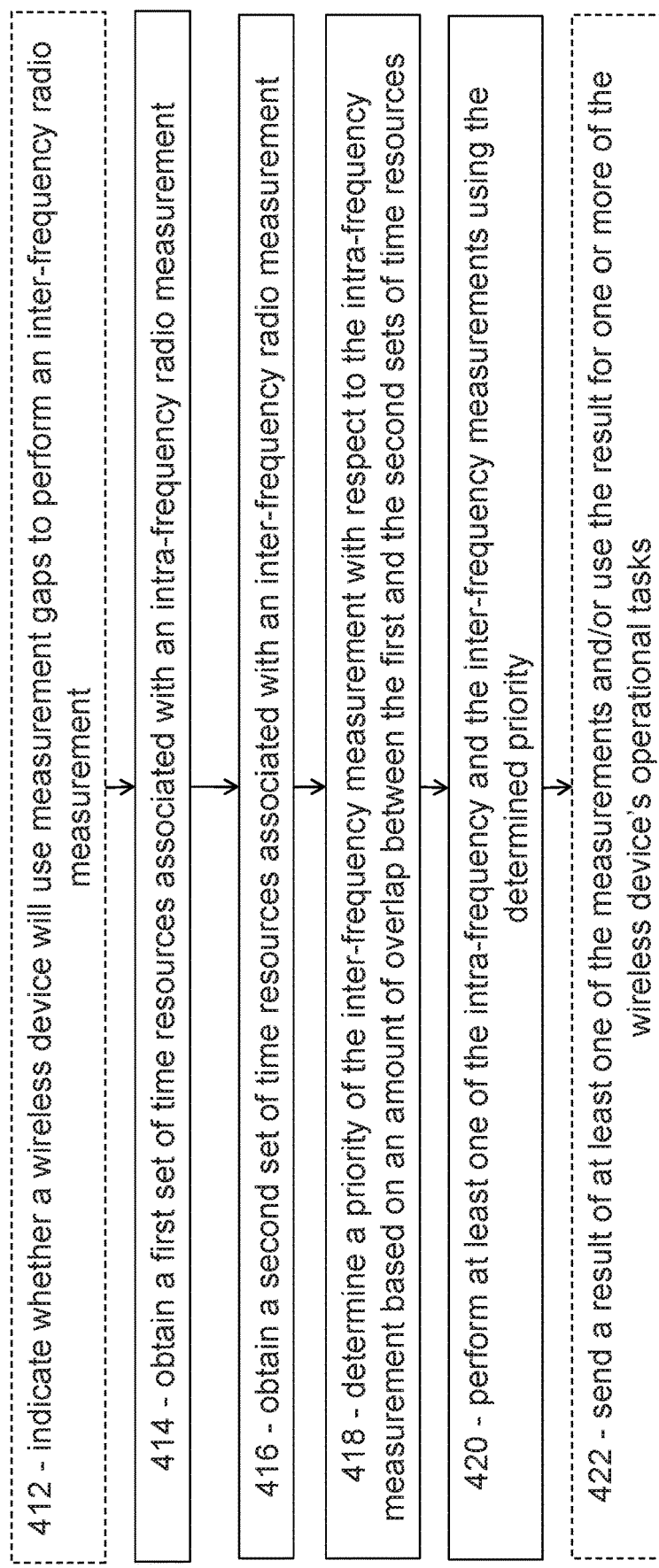
FIG. 4 is a flow diagram of an example method in a wireless device, according to some embodiments.

Particular embodiments include methods in a wireless device and in a network node. Example methods are illustrated in FIGS. 4 and 5.

A wireless device, such as wireless device 110, may be configured to perform at least one intra-frequency radio measurement on at least one carrier frequency f1 (e.g., serving carrier frequency) in a first set of time resources (e.g., DMTC, RMTC, etc.) and at least one inter-frequency radio measurement on at least one carrier frequency f2 (e.g., non-serving carrier frequency) in a second set of time resources (e.g., DMTC, RMTC, etc.). At least one of f1 and f2 is operating under a flexible frame structure (e.g., FS3).

Examples of a first radio measurement include: CRS-based or CSI-RS based measurement on SCC or PCC or PSCC, intra-frequency RSSI, intra-frequency channel occupancy, CA measurements, CA LAA measurements, or intra-frequency LAA measurements (LAA and "under FS3" may be used inter-changeably herein), CA measurements on activated CCs, and CA measurement on deactivated CC.

Examples of a second radio measurement include: inter-frequency CRS-based or CSI-RS based measurement, inter-frequency RSSI, inter-frequency channel occupancy, inter-frequency LAA measurement, any other inter-frequency or even inter-RAT measurement, and CA measurements on deactivated CC (in one example measurements on deactivated CC may have a lower priority than on activated CC; in another example measurements on deactivated CC may have a higher priority than inter-frequency measurement).

FIG. 4 is a flow diagram of an example method in a wireless device, according to some embodiments. In particular embodiments, one or more steps of method 400 may be performed by components of wireless network 100 described with reference to FIG. 3.

Method 400 begins at step 412, where a wireless device indicates to another node (e.g., another wireless device, a network node, eNodeB, or positioning node) whether the wireless device will use measurement gaps to perform the inter-frequency radio measurement. For example, wireless device 110 may indicate to network node 120 its ability to perform the second radio measurement without measurement gaps or its need for the measurement gaps.

In particular embodiments, such capability may also comprise the wireless device's ability to operate according to one or more embodiments described herein. The indicated information may determine, e.g., the first and the second sets of resources, whether measurement gaps will be configured and/or used, performance metric/target/requirement, priority, etc. The indicated information may be provided upon a request from another node or in an unsolicited way, e.g., upon a triggering condition or event or upon receiving a measurement configuration from another node.

At step 414, the wireless device obtains a first set of time resources associated with the first radio measurement. For example, wireless device 110 may obtain a first set of time resources associated with the first radio measurement.

In particular embodiments, the obtained resources may correspond to downlink radio signals/channels the wireless device is expected to receive/measure or the resources in which the downlink radio signals/channels relevant for the first radio measurement are transmitted by another radio node (e.g., serving or neighbor BS).

The first set of time resources may comprise periodic time resources. In one example, the first set of time resources may comprise periodic DMTC occasions (e.g., with 40 ms, 80 ms, or 160 ms periodicity) and/or DRS signals on f1 in a first cell.

The obtaining may be based, e.g., on one or more of: (a) one or more messages or indications received from another node (e.g. serving BS) via higher layer signaling and/or physical layer (e.g., PDCCH); (b) first measurement configuration; (c) pre-defined value(s) (e.g., pre-defined 6 ms DMTC occasion duration); (d) pre-defined rule or configuration (e.g., a certain periodicity in certain conditions); (e) radio node's activity state (e.g., DRX or non-DRX); and/or (f) history, stored configuration, etc.

Obtaining the first set of time resources may comprise obtaining the first measurement configuration. Obtaining the first measurement configuration may comprise obtaining associated measurement performance metrics/target/characteristics (defined below). The first measurement configuration may be received from another node (e.g., base station) or determined based on a rule, history, etc.

At step 416, the wireless device obtains a second set of time resources associated with the second radio measurement. For example, wireless device 110 may obtain a second set of time resources associated with the second radio measurement.

In some embodiments, the resources may correspond to downlink radio signals/channels the wireless device is expected to receive/measure or the resources in which the downlink radio signals/channels relevant for the second radio measurement are transmitted by another radio node (e.g., serving or neighbor base station).

The second set of time resources may comprise periodic time resources. In one example, the second set of time resources may comprise periodic DMTC occasions (e.g., with 40 ms, 80 ms, or 160 ms periodicity) on f2 in a second cell and/or time resources configured with measurement gaps.

The obtaining may be based, e.g., on one or more of: (a) one or more messages or indications received from another node (e.g. serving base station) via higher layer signaling and/or physical layer (e.g., PDCCH); (b) first measurement configuration; (c) pre-defined value(s) (e.g., pre-defined 6 ms DMTC occasion duration); (d) pre-defined rule or configuration (e.g., a certain periodicity in certain conditions); (e) radio node's activity state (e.g., DRX or non-DRX); and/or (f) history, stored configuration, etc.

Obtaining the second set of time resources may comprise obtaining the second measurement configuration. Obtaining the second measurement configuration may comprise obtaining associated measurement performance metrics/target/characteristics (defined below). The second measurement configuration may be received from another node (e.g., BS) or determined based on a rule, history, etc.

At step 418, the wireless device determines a priority of the second measurement with respect to the first measurement. The priority may be determined based on an amount of overlap between the first and the second sets of time resources. For example, wireless device 110 may determine a priority of the second measurement with respect to the first measurement.

In some embodiments, determining the priority further comprises determining the amount of overlap between the first and the second sets of time resources. In one example, the determining the priority may further comprise determining that the priority is lower (e.g., lower for the second radio measurement compared to the first radio measurement). In another example, determining the priority may further comprise determining that the priority is higher. In yet another example, determining the priority may further comprise determining that the priority is the same.

Some examples are listed below (the examples may also combine with each other):

The priority is lower (for the second radio measurement), when f1 and f2 are FS3 carriers, and f2 is inter-frequency and f1 is intra-frequency The priority is lower (for the second radio measurement), when f1 and f2 are FS3 carriers, and f2 is inter-frequency and f1 is intra-frequency, when the first and the second sets of time resources overlap fully (e.g., all DMTC occasions on f1 overlap with all DMTC occasions on f2 and/or all measurement gaps)

The priority is lower (for the second radio measurement), when f1 and f2 are FS3 carriers, and f2 is inter-frequency and f1 is intra-frequency, when the first and the second sets of time resources overlap at least in part (e.g., at least some DMTC occasions on f1 overlap with at least some DMTC occasions and/or measurement gaps on f2)

The priority is lower (for the second radio measurement) when the amount of the overlap is at or above a first threshold (e.g., 50%, 100%; 4 out of 6 subframes)

The priority is the same when the amount of the overlap is below the first threshold The priority is higher (for the second radio measurement) when the amount of the overlap is below a second threshold (e.g., second threshold <=first threshold)

The priority is lower (for the second radio measurement), when f2 is FS3-based and f1 is FS3-based or FDD or TDD The priority is not lower (for the second radio measurement), when f2 is FDD or TDD and f1 is FS3-based The priority is lower (for the second radio measurement) if the bandwidth for the second measurement is above a first threshold and/or the bandwidth for the first measurement is below a second threshold The priority is the same or higher (for the second radio measurement) if the bandwidth for the second measurement is below a first threshold and/or the bandwidth for the first measurement is above a second threshold The priority is determined by a relation between the periodicity T1 of the first time resources and the periodicity T2 of the second time resources, e.g., the priority is lower (for the first radio measurement) when T1=T2 or when T1<=T2, the priority may increase when T1:T2 increases, etc.

Measurements on deactivated CC may have a lower priority than on activated CC; in another example measurements on deactivated CC may have a higher priority than inter-frequency measurement Measurement on SCCs performed in DMTC occasions may have a higher priority than inter-frequency measurements in DMTC occasions Measurement on SCCs performed in RMTC occasions may have the same or a lower priority than inter-frequency measurements in DMTC occasions Measurement on SCCs performed in RMTC occasions may have the same or higher priority than inter-frequency measurements in DMTC occasions Measurement on SCCs performed in RMTC occasions may have the lower priority than inter-frequency measurements in DMTC occasions Measurement on SCCs performed in RMTC occasions may have the same or a higher priority than inter-frequency measurements in RMTC occasions In some embodiments, determining the priority may further comprise determining the priority of the first radio measurement. In one example, if the second measurement has a lower priority, then the first measurement may have a higher relative priority with respect to the second measurement. In another example, the first measurement priority may be varied relative to its own reference priority, e.g., compared to a priority used when the second measurement is not configured in parallel.

At step 420, the wireless device performs at least one of the first and the second measurements based on the determined priority(-ies). For example, wireless device 110 may perform the first measurement based on the determined priority.

In some embodiments, the performing of at least one of the first and the second measurements may further comprise determining one or more performance metrics/targets/requirements associated with the first and/or the second measurements. Example performance metrics/target/characteristics include: measurement time, measurement time period, measurement accuracy, number of samples taken/reported, and measurement reporting time.

Performing the first and/or the second radio measurements based on the priority(-ies) may comprise, e.g.:
- Dropping/postponing/delaying a lower-priority measurement in all or some measurement occasions, while performing the higher-priority measurement (e.g., at least in the first and second resources which overlap)
- Performing the measurement with a lower-priority may comprise performing with a more relaxed performance characteristic/target/requirement (e.g., when the first and second measurements are not configured in parallel, a first and second reference requirements can be met, respectively, while when they are configured in parallel a lower priority may mean that a longer measurement period is needed compared to the corresponding reference requirement)
  - In a further example, the relaxed requirement may comprise fewer samples and/or longer measurement time (due to the overlap)
- The second measurement with a lower priority may need longer measurement time, while meeting the same (reference) accuracy requirement, while the first measurement (with a higher priority) may be required to perform the measurement within the reference measurement time (e.g., not relaxed).
- When CA and inter-frequency measurements are configured on carriers with E-UTRA operation following FS3 and UE requires measurement gaps for performing such inter-frequency measurements and the configured measurement gaps overlap with DMTC occasions on activated SCCs operating under FS3, an additional cell identification delay may be expected. The UE shall be able to perform the inter-frequency measurements provided that not all measurement gaps overlap with DMTC occasions on activated SCCs.
- When CA and inter-frequency measurements are configured on carriers with E-UTRA operation following FS3 and UE requires measurement gaps for performing such inter-frequency measurements and the configured measurement gaps overlap with DMTC occasions on configured SCCs operating under FS3, an additional cell identification delay may be expected. The UE shall be able to perform the inter-frequency measurements provided that not all measurement gaps overlap with DMTC occasions on configured SCCs.
- An additional delay for lower-priority measurement may be expected depending on the periodicity, when DMTC periodicity is above a first threshold and/or below a second threshold
- A lower priority measurement may be performed with a more relaxed requirement, while a higher priority measurement may be performed with a less relaxed requirement (but still relaxed).

Performing measurement with the same priorities when the first and the second time resources overlap may comprise performing the measurements while meeting relaxed requirements for both the first and the second measurements.

A relaxed requirement compared to a reference may comprise, e.g., any one or more of:
- worse accuracy, or
- same accuracy and longer measurement period, or
- Longer measurement period defined as k*Tref, where k is a scaling factor (the scaling factor may depend, e.g., on the number of inter-frequency carriers, the number of CCs or SCCs or FS3 SCCs, the number of activated CCs, etc.), measurement periodicity (e.g., k=1 if T<threshold or T1:T2<threshold or T1:T2>threshold). There may also be a maximum limit on the scaling factor k (e.g. k<=2 or k<=3 or k<=f(Ncc,Ninter) where f can be sum, min, max, average, etc., Ncc can be number of CCs, Ninter can be number of inter-frequency carriers).

At step 422, the wireless device, such as wireless device 110, sends to another node (e.g., network node, BS, positioning node, another UE) a result of the first and/or second measurements and/or use the result for one or more radio node's operational tasks.

Some examples of the operational tasks include: RRM, MDT, SON, positioning, mobility, cell change or handover, reading system information (e.g., of own or neighbor cell), and logging or saving the result (e.g., in a database) for future use.

Modifications, additions, or omissions may be made to method 400 illustrated in FIG. 4. Additionally, one or more steps in method 400 may be performed in parallel or in any suitable order.

FIG. 5 is a flow diagram of an example method in a network node, according to some embodiments. In particular embodiments, one or more steps of method 500 may be performed by components of wireless network 100 described with reference to FIG. 3.

Method 500 begins at step 512, where a network node obtains an ability of a wireless device to perform the inter-frequency radio measurement with or without measurement gaps. For example, network node 120 may obtains the ability of wireless device 110 to perform the second radio measurement without measurement gaps or its need for the measurement gaps.

The obtaining may be based, e.g., on message or indication received from the radio node (see also Step 0 in Section 5.2) or from another node (e.g., its serving BS), history, observing UE behavior, etc.

At step 514, the network node, such as network node 120, determines a priority of the second measurement with respect to the first measurement. The priority may be based on an amount of overlap between the first and the second sets of time resources. In one example, the priority may be determined based on the rules described with respect to FIG. 4. The determining may also comprise obtaining the first and second sets of time resources associated with the first and second measurements, respectively (see examples described with respect to FIG. 4, steps 414-416).

At step 516, the network node, such as network node 120, performs various actions based on the determined priority. Examples include:
- Determining of one or more performance metrics/targets/requirements associated with the first and/or the second measurements—see e.g. description of FIG. 4.
- Using the determined one or more performance metrics/targets/requirements associated with the first and/or the second measurements for receiving measurement results.
- Adapting the first and/or second measurement configuration.

Adapting DMTC configuration on f1.
Adapting DMTC configuration on f2.
Adapting RMTC configuration on f1.
Adapting RMTC configuration on f2.
Adapting measurement reporting configuration (e.g., reporting periodicity).
Adapting the receiving at the network node (e.g., adapting to the adapted reporting interval, relaxed measurement time, etc.).
Sending to the radio node at least one parameter adapted according to the above (e.g., adapted DMTC configuration or measurement reporting configuration).
Examples of adaption may include, e.g.:
Avoiding/reducing/minimizing the overlap between:
  DMTC or RMTC occasions or measurement cycles on f1, and
  measurement gaps for f2, DMTC occasions on f2 and/or RMTC occasions on f2
Avoiding/reducing/minimizing the number of or probability of dropped lower-priority measurements or measurement samples due to the overlap The adaptation may further comprise, e.g., any one or more of:
Increasing measurement bandwidth (to compensate for fewer occasions for lower-priority measurements)
Increasing the periodicity or reducing the interval between the lower-priority measurement (e.g., measurement occasions, DMTC, or RMTC) to enable more measurement occasions to compensate for the lost ones
Increasing the time interval or period between measurement gaps
Avoiding configuring in parallel the first and the second measurement, e.g., postponing/delaying inter-frequency measurements on f2 until when the first measurements on f1 are done
Adapting a performance target/metric/requirement, e.g., expecting the radio node to meet a more relaxed requirement for the lower priority measurement when the first and second measurements are configured in parallel Modifications, additions, or omissions may be made to method 500 illustrated in FIG. 5. Additionally, one or more steps in method 500 may be performed in parallel or in any suitable order.

Figure 6B:
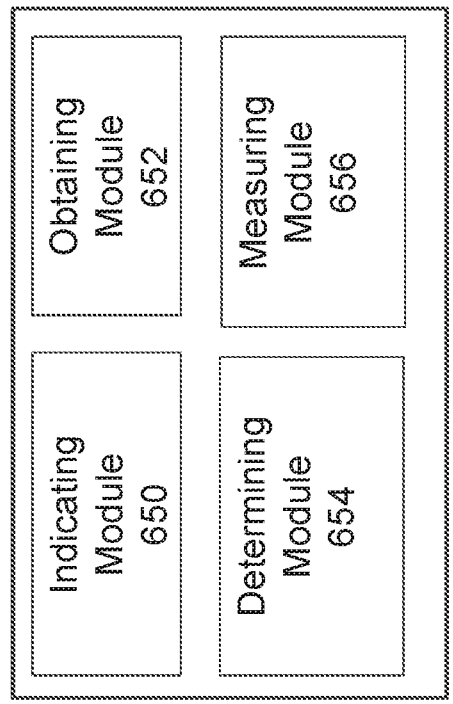
FIG. 6B is a block diagram illustrating example components of a wireless device.
Figure 6A:
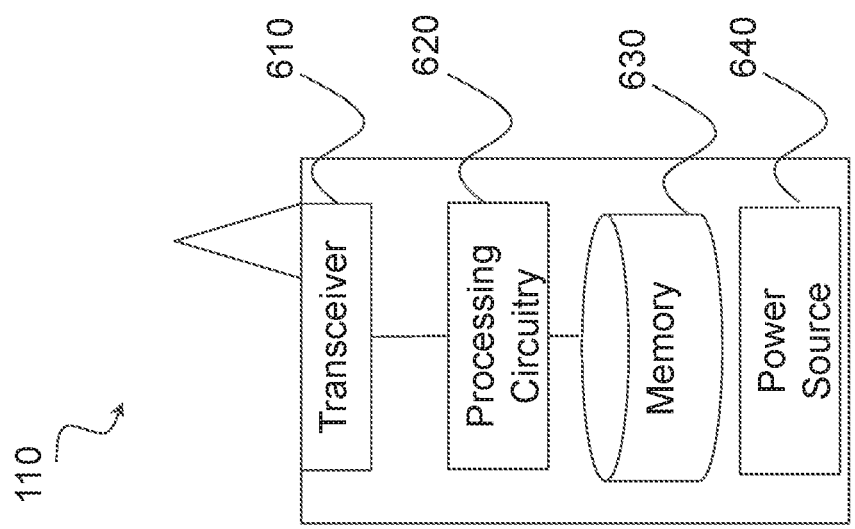
FIG. 6A is a block diagram illustrating an example embodiment of a wireless device.

FIG. 6A is a block diagram illustrating an example embodiment of a wireless device. The wireless device is an example of the wireless devices 110 illustrated in FIG. 3. In particular embodiments, the wireless device is capable of performing at least one intra-frequency radio measurement on at least one carrier frequency f1 in a first set of time resources and at least one inter-frequency radio measurement on at least one carrier frequency f2 in a second set of time resources. At least one of f1 and f2 is operating under a flexible frame structure. The wireless device is capable of obtaining the first set of time resources associated with the intra-frequency radio measurement; obtaining the second set of time resources associated with the inter-frequency radio measurement; determining a priority of the inter-frequency measurement with respect to the intra-frequency measurement based on an amount of overlap between the first and the second sets of time resources; and performing at least one of the intra-frequency and the inter-frequency measurements using the determined priority.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a NB-IoT device, or any other device that can provide wireless communication. The wireless device includes transceiver 610, processing circuitry 620, and memory 630. In some embodiments, transceiver 610 facilitates transmitting wireless signals to and receiving wireless signals from wireless network node 120 (e.g., via an antenna), processing circuitry 620 executes instructions to provide some or all of the functionality described herein as provided by the wireless device, and memory 630 stores the instructions executed by processing circuitry 620.

Processing circuitry 620 includes any suitable combination of hardware and software implemented in one or more integrated circuits or modules to execute instructions and manipulate data to perform some or all of the described functions of the wireless device. In some embodiments, processing circuitry 620 may include, for example, one or more computers, one more programmable logic devices, one or more central processing units (CPUs), one or more microprocessors, one or more applications, and/or other logic, and/or any suitable combination of the preceding. Processing circuitry 620 may include analog and/or digital circuitry configured to perform some or all of the described functions of wireless device 110. For example, processing circuitry 620 may include resistors, capacitors, inductors, transistors, diodes, and/or any other suitable circuit components.

Memory 630 is generally operable to store computer executable code and data. Examples of memory 630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processing circuitry 620 in communication with transceiver 610 communicates wireless signals with radio network node 120 or other wireless devices 110. In particular embodiments, processing circuitry 620 in communication with transceiver 610 may adapt timing adjustment delay for transmissions with one or more network nodes 120. Other embodiments of the wireless device may include additional components (beyond those shown in FIG. 6A) responsible for providing certain aspects of the wireless device's functionality, including any of the functionality described above and/or any additional functionality (including any functionality necessary to support the solution described above).

FIG. 6B is a block diagram illustrating example components of a wireless device 110. The components may include indicating module 650, obtaining module 652, determining module 654, and measuring module 656.

Indicating module 650 may perform the obtaining functions of wireless device 110. For example, indicating module 650 may perform the indicating functions of step 412 in FIG. 4. In certain embodiments, indicating module 650 may include or be included in processor 620. In particular embodiments, indicating module 650 may communicate with obtaining module 652, determining module 654, and measuring module 656.

Obtaining module 652 may perform the obtaining functions of wireless device 110. For example, obtaining module 652 may perform the obtaining functions of steps 414 and 416 in FIG. 4. In certain embodiments, obtaining module 652 may include or be included in processor 620. In particular embodiments, obtaining module 652 may communicate with indicating module 650, determining module 654, and measuring module 656.

Determining module 654 may perform the determining functions of wireless device 110. For example, determining module 654 may perform the determining functions of step 418 in FIG. 4. In certain embodiments, determining module 654 may include or be included in processor 620. In particular embodiments, determining module 654 may communicate with indicating module 650, obtaining module 652, and measuring module 656.

Measuring module 656 may perform the measuring functions of wireless device 110. For example, measuring module 656 may perform the measuring functions of step 420 in FIG. 4. In certain embodiments, measuring module 656 may include or be included in processor 620. In particular embodiments, measuring module 656 may communicate with indicating module 650, obtaining module 652, and determining module 654.

Figure 7B:
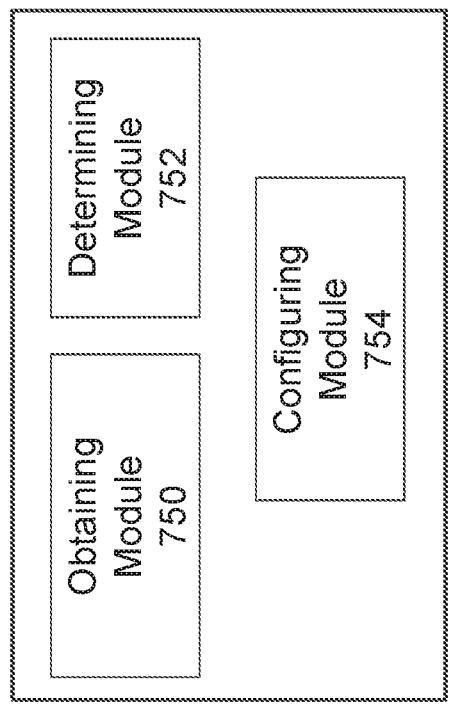
FIG. 7B is a block diagram illustrating example components of a network node.
Figure 7A:
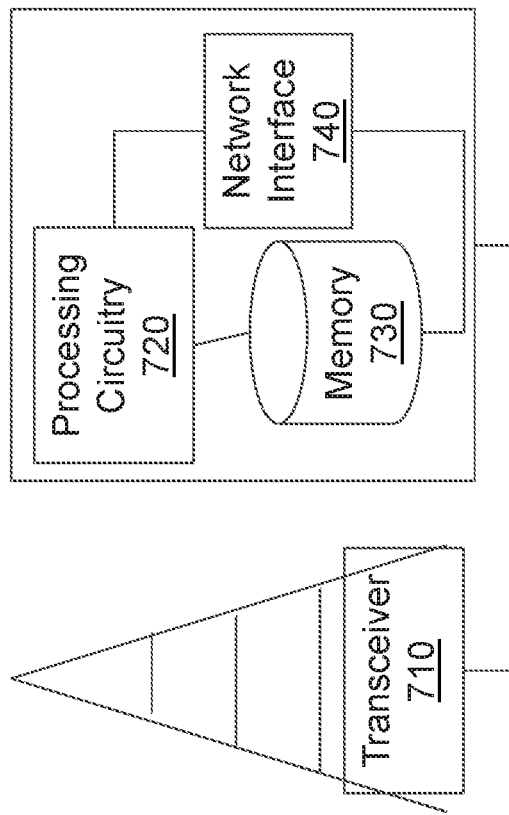
FIG. 7A is a block diagram illustrating an example embodiment of a network node.

FIG. 7A is a block diagram illustrating an example embodiment of a network node. The network node is an example of the network node 120 illustrated in FIG. 3. In particular embodiments, the network node is capable of operating in a network with a wireless device operable to perform at least one intra-frequency radio measurement on at least one carrier frequency f1 in a first set of time resources and at least one inter-frequency radio measurement on at least one carrier frequency f2 in a second set of time resources. At least one of f1 and f2 is operating under a flexible frame structure. The network node is further capable of determining a priority of the inter-frequency measurement with respect to the intra-frequency measurement based on an amount of overlap between the first and the second sets of time resources; and performing a measurement configuration using the determined priority.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 710, processing circuitry 720, at least one memory 730, and at least one network interface 740. Transceiver 710 facilitates transmitting wireless signals to and receiving wireless signals from a wireless device, such as wireless devices 110 (e.g., via an antenna); processing circuitry 720 executes instructions to provide some or all of the functionality described above as being provided by a network node 120; memory 730 stores the instructions executed by processing circuitry 720; and network interface 740 communicates signals to backend network components, such as a gateway, switch, router, Internet, Public Switched Telephone Network (PSTN), controller, and/or other network nodes 120. Processing circuitry 720 and memory 730 can be of the same types as described with respect to processing circuitry 620 and memory 630 of FIG. 6A above.

In some embodiments, network interface 740 is communicatively coupled to processing circuitry 720 and refers to any suitable device operable to receive input for network node 120, send output from network node 120, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

In particular embodiments, processing circuitry 720 in communication with transceiver 710 may adapt timing adjustment delay parameters with other network nodes 120 and/or with wireless devices 110.

Other embodiments of network node 120 include additional components (beyond those shown in FIG. 7A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 7B is a block diagram illustrating example components of a network node 120 The components may include obtaining module 750, determining module 752 and configuring module 754.

Obtaining module 750 may perform the obtaining functions of network node 120. For example, obtaining module 750 may perform the obtaining functions of step 512 in FIG. 5. In certain embodiments, obtaining module 750 may include or be included in processor 720. In particular embodiments, obtaining module 750 may communicate with determining module 752 and configuring module 754.

Determining module 752 may perform the determining functions of network node 120. For example, determining module 752 may perform the determining functions of step 514 in FIG. 5. In certain embodiments, determining module 752 may include or be included in processor 720. In particular embodiments, determining module 752 may communicate with configuring module 754 and obtaining module 750.

Configuring module 754 may perform the configuring functions of network node 120. For example, configuring module 754 may perform the configuring functions of step 516 in FIG. 5. In certain embodiments, configuring module 754 may include or be included in processor 720. In particular embodiments, configuring module 754 may communicate with obtaining module 750 and determining module 752.

Some embodiments of the disclosure may provide one or more technical advantages. Some embodiments may benefit from some, none, or all of these advantages. Other technical advantages may be readily ascertained by one of ordinary skill in the art. A particular advantage of some embodiments is that the UE may perform inter-frequency measurements and meet requirements.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure.

Other changes, substitutions, and alterations are possible without departing from the scope of this disclosure.

The following examples are examples of how certain aspects of the embodiments described herein could be implemented within the framework of a specific communication standard. In particular, the following examples provide a non-limiting example of how the embodiments described herein could be implemented within the framework of a 3GPP RAN standard. The changes described by the examples are merely intended to illustrate how certain aspects of the embodiments could be implemented in a particular standard. However, the embodiments could also be implemented in other suitable manners, both in the 3GPP Specification and in other specifications or standards. The following are example sections of a 3GPP standard.

E-UTRAN FDD—FS3 inter-frequency measurements when no DRX is used.

When measurement gaps are scheduled or the UE supports capability of conducting such measurements without gaps, the UE shall be able to identify a new detectable FS3 inter-frequency cell within the cell identification time $T_{identify\_inter\_FS3}$, which shall include detection of the cell and additionally performing a single measurement within the measurement period of $T_{measure\_inter\_FS3\_CRS}$ when no DRX is used, where:

$T_{identify\_inter\_FS3}$ is the inter-frequency period for cell identification as shown in Table 1, $T_{measure\_inter\_FS3\_CRS}$ is the inter-frequency period for measurements as shown in Table 2, $T_{DMTC\_periodicity}$ is the discovery signal measurement timing configuration periodicity of higher layer, N is the number of carriers operating under FS3 and which are subject to the channel assessment prior to transmissions, L is the number of configured discovery signal occasions which are not available during the time for cell identification at the UE during measurement gaps due to the absence of the necessary radio signals from the measured cell, M is the number of configured discovery signal occasions which are not available during $T_{measure\_inter\_FS3\_CRS}$ for the measurements at the UE during measurement gaps due to the absence of the necessary radio signals from the measured cell.

If higher layer filtering is used, an additional cell identification delay can be expected.

The requirements in this section apply, provided that L and M are such that: the inter-frequency cell identification period $T_{identify\_inter\_FS3}$ does not exceed $*N_{freq}*Max\{T_{DMTC\_periodicity}, MGRP\}$, and the inter-frequency period $T_{measure\_inter\_FS3\_CRS}$ for measurements does not exceed $[60]*N_{freq}*Max\{T_{DMTC\_periodicity}, MGRP\}$.

When CA and inter-frequency measurements are configured on carriers with E-UTRA operation following FS3 and UE requires measurement gaps for performing such inter-frequency measurements and the configured measurement gaps overlap with DMTC occasions on activated SCCs operating under FS3, an additional cell identification delay may be expected. The UE shall be able to perform the inter-frequency measurements provided that not all measurement gaps overlap with DMTC occasions on activated SCCs.

TABLE 1

Inter-frequency cell identification requirements under operation with frame structure 3

| SCH $\hat{E}s$/Iot | CRS measurement bandwidth[Note 2] [RB] | CRS $\hat{E}s$/Iot | $T_{identify\_inter\_FS3}$ [ms] |
|---|---|---|---|
| [0] ≤ SCH $\hat{E}s$/Iot | <25 | [−6] ≤ CRS $\hat{E}s$/Iot | $([7] * N_{freq} + L * N) * Max\{T_{DMTC\_periodicity}, MGRP\}$ |
| [−6] ≤ SCH $\hat{E}s$/Iot < [0] | <25 | | $([25] * N_{freq} + L * N) * Max\{T_{DMTC\_periodicity}, MGRP\}$ |
| [0] ≤ SCH $\hat{E}s$/Iot | ≥25 | [0] ≤ CRS $\hat{E}s$/Iot | $([3] * N_{freq} + L * N) * Max\{T_{DMTC\_periodicity}, MGRP\}$ |
| [−6] ≤ SCH $\hat{E}s$/Iot < [0] | ≥25 | | $([9] * N_{freq} + L * N) * Max\{T_{DMTC\_periodicity}, MGRP\}$ |

NOTE 1:
Discovery signal occasion duration (ds-OccasionDuration) is 1 ms.
NOTE 2 The requirements for measurement bandwidth ≥25 RB are optional.

TABLE 2

Inter-frequency measurement requirements under operation with frame structure 3

| SCH $\hat{E}s$/Iot | CRS measurement bandwidth[Note 2] [RB] | CRS $\hat{E}s$/Iot | $T_{measure\_inter\_FS3\_CRS}$ [ms] |
|---|---|---|---|
| [0] ≤ SCH $\hat{E}s$/Iot | <25 | [−6] ≤ CRS $\hat{E}s$/Iot | $([5] * N_{freq} + M * N) * Max\{T_{DMTC\_periodicity}, MGRP\}$ |
| [−6] ≤ SCH $\hat{E}s$/Iot < [0] | <25 | | $([20] * N_{freq} + M * N) * Max\{T_{DMTC\_periodicity}, MGRP\}$ |
| [0] ≤ SCH $\hat{E}s$/Iot | ≥25 | [0] ≤ CRS $\hat{E}s$/Iot | $([1] * N_{freq} + M * N) * Max\{T_{DMTC\_periodicity}, MGRP\}$ |
| [−6] ≤ SCH $\hat{E}s$/Iot < [0] | ≥25 | | $([4] * N_{freq} + M * N) * Max\{T_{DMTC\_periodicity}, MGRP\}$ |

NOTE 1:
Discovery signal occasion duration (ds-OccasionDuration) is 1 ms.
NOTE 2 The requirements for measurement bandwidth ≥25 RB are optional.

A cell shall be considered detectable when the following conditions are met during the discovery signal occasions which are available during $T_{identify\_inter\_FS3}$: (a) RSRP related side conditions are fulfilled for a corresponding Band; (b) RSRQ related side conditions are fulfilled for a corresponding Band; and (c) SCH Ês/Iot is according to Table 1.

When measurement gaps are scheduled for FS3 inter-frequency measurements or the UE supports capability of conducting such measurements without gaps, the UE physical layer shall be capable of reporting RSRP and RSRQ measurements to higher layers with measurement accuracy with measurement period given by table 2.

The UE shall be capable of performing RSRP and RSRQ measurements of at least 3 identified inter-frequency cells per FS3 inter-frequency for up to 3 FS3 inter-frequencies and the UE physical layer shall be capable of reporting RSRP and RSRQ measurements to higher layers when no DRX is in use, either measurement gaps are scheduled or the UE supports capability of conducting such measurements without gaps.

RSSI Measurements—E-UTRAN Intra-Frequency Measurements

The UE physical layer shall be capable of performing the RSSI measurements on one or more serving carriers operating under frame structure type 3, if the carrier(s) are indicated by higher layers, and reporting the RSSI measurements to higher layers. The UE physical layer shall provide to higher layers a single RSSI sample for each OFDM symbol within each configured RSSI measurement duration occurring with a configured RSSI measurement timing configuration periodicity. The RSSI measurement period corresponds to max(reportInterval, rmtc-Period), where reportInterval and rmtc-Period are configured for the RSSI measurement by higher layers.

When intra-frequency RSSI measurements are configured and inter-frequency measurements are configured on carriers with E-UTRA operation following FS3 and UE requires measurement gaps for performing such inter-frequency measurements and the configured measurement gaps overlap with RMTC occasions on activated SCCs operating under FS3, an additional RSSI measurement period delay or reporting delay may be expected. The UE shall be able to report RSSI at least when not all RMTC occasions overlap with measurement gaps.

Channel Occupancy Measurements—E-UTRAN Intra-Frequency Channel Occupancy Measurements The UE shall be capable of estimating the channel occupancy on one or more serving carrier frequencies indicated by higher layers, based on RSSI samples provided by the physical layer. The channel occupancy measurement period corresponds to max(reportInterval, rmtc-Period), where reportInterval and rmtc-Period are configured for the channel occupancy measurement by higher layers.

When intra-frequency channel occupancy measurements are configured and inter-frequency measurements are configured on carriers with E-UTRA operation following FS3 and UE requires measurement gaps for performing such inter-frequency measurements and the configured measurement gaps overlap with RMTC occasions on activated SCCs operating under FS3, an additional channel occupancy measurement period delay or reporting delay may be expected. The UE shall be able to report channel occupancy at least when not all RMTC occasions overlap with measurement gaps.

Abbreviations

3GPP 3rd Generation Partnership Project
CA Carrier Aggregation
CC Component Carrier
CCA Clear Channel Assessment
CRS Common Reference Signal
D2D Device to Device
DRS Discovery Reference Signal
DRX Discontinuous Reception
eNB Evolved Node B
eNodeB Evolved Node B
E-UTRA Enhanced UTRA
FDD Frequency Division Duplex
FFT Fast Fourier Transform
FS3 Frame Structure Type 3
HSPA High Speed Packet Access
LAA License Assisted Access
LBT Listen Before Talk
LTE Long-Term Evolution
M2M Machine to Machine
MBMS Multimedia Broadcast Multicast Service
MGRP Measurement Gap Repetition Period
MTC Machine Type Communication
NR New Radio
OFDM Orthogonal Frequency Division Multiplexing
PCC Primary Component Carrier
PCell Primary Cell
PDCCH Physical Downlink Control Channel
PSC Primary Serving Cell
PSS Primary Synchronization Signal
RAT Radio Access Technology
RB Resource Block
RF Radio Frequency
RLM Radio Link Monitoring
RRC Radio Resource Control
RSRP Reference Signal Received Power
RSRQ Reference Signal Received Quality
SCC Secondary Component Carrier
SCell Secondary Cell
SFN Single Frequency Network/System Frame Number
SON Self-Optimizing Network
SSC Secondary Serving Cell
TDD Time Division Duplex
TP Transmission Point
TRP Transmission Reception Point
TTI Transmission Time Interval
UE User Equipment
UMTS Universal Mobile Telecommunications System
UTRA UMTS Terrestrial Radio Access

The invention claimed is:

1. A method in a wireless device for performing at least one intra-frequency radio measurement on at least one carrier frequency f1 in a first set of time resources and at least one inter-frequency radio measurement on at least one carrier frequency f2 in a second set of time resources, wherein at least one of f1 and f2 is operating under a flexible frame structure, the method comprising:
    obtaining the first set of time resources associated with the intra-frequency radio measurement;
    obtaining the second set of time resources associated with the inter-frequency radio measurement;
    determining a priority of the inter-frequency radio measurement with respect to the intra-frequency radio measurement based on an amount of overlap between the first and the second sets of time resources, wherein determining the priority comprises determining the priority according to the following formula: the priority is equal to a first priority when the amount of overlap is below a threshold and the priority is equal to a second priority when the amount of overlap is equal to or greater than the threshold; and performing at least one of the intra-frequency and the inter-frequency radio measurements using the determined priority in an overlapping time resource.

2. A wireless device for performing at least one intra-frequency radio measurement on at least one carrier frequency f1 in a first set of time resources and at least one inter-frequency radio measurement on at least one carrier frequency f2 in a second set of time resources, wherein at least one of f1 and f2 is operating under a flexible frame structure, the wireless device comprising processing circuitry operable to:

obtain the first set of time resources associated with the intra-frequency radio measurement;

obtain the second set of time resources associated with the inter-frequency radio measurement;

determine a priority of the inter-frequency radio measurement with respect to the intra-frequency radio measurement based on an amount of overlap between the first and the second sets of time resources by determining a first priority when the amount of overlap is below a threshold and determining a second priority when the amount of overlap is equal to or greater than the threshold; and perform at least one of the intra-frequency and the inter-frequency radio measurements using the determined priority in an overlapping time resource.

3. The wireless device of claim 2, the processing circuitry further operable to send, to another wireless device or a network node, a result of at least one of the intra-frequency and the inter-frequency measurements.

4. The wireless device of claim 2, the processing circuitry further operable to indicate to another wireless device or a network node whether the wireless device will use measurement gaps to perform the inter-frequency radio measurement.

5. The wireless device of claim 2, wherein the second set of time resources includes measurement gaps.

6. The wireless device of claim 2, wherein at least one of the first set of time resources and the second set of time resources is associated with a discovery reference signal (DRS) measurement timing configuration (DMTC) or a received signal strength indicator (RSSI) measurement timing configuration (RMTC).

7. The wireless device of claim 2, wherein the processing circuitry is operable to determine the priority by using a first function for determining an amount of time for performing at least one of the intra-frequency measurement and the inter-frequency measurement when there is no overlap between the first and the second sets of time resources, and using a second function for determining the amount of time when the second set of time resources at least partially overlaps with the first set of time resources.

8. The wireless device of claim 7, wherein the processing circuitry is operable to determine the priority by using a third function for determining the amount of time when the second set of time resources completely overlaps the first set of time resources.

9. The wireless device of claim 2, wherein the determined priority of the inter-frequency measurement is lower than a priority of the intra-frequency measurement.

10. The wireless device of claim 2, wherein the processing circuitry is operable to perform at least one of the intra-frequency and the inter-frequency measurements using the determined priority by not performing a lower priority measurement in an overlapping time resource.

11. The wireless device of claim 2, wherein the processing circuitry is operable to perform at least one of the intra-frequency and the inter-frequency measurements using the determined priority by scaling an amount of time for performing at least one of the intra-frequency and the inter-frequency measurements.

12. The wireless device of claim 11, wherein scaling the amount of time comprises extending an amount of time for performing a lower priority measurement.

13. The wireless device of claim 11, wherein scaling the amount of time comprises scaling with a different scaling factor depending on the amount of overlap between the first and second sets of time resources.

14. The wireless device of claim 11, wherein scaling the amount of time comprises extending the intra-frequency measurement period when there is overlap between the first and second sets of time resources and not extending the intra-frequency measurement period when there is not overlap between the first and second sets of time resources.

15. The wireless device of claim 2, wherein the inter-frequency measurement comprises a measurement that is performed in a measurement gap or a measurement based on discovery reference signal (DRS) measurement timing configuration (DMTC) or received signal strength indicator (RSSI) measurement timing configuration (RMTC) occasions on a secondary carrier component operating under the flexible frame structure.

16. A method in a network node for operating in a network with a wireless device operable to perform at least one intra-frequency radio measurement on at least one carrier frequency f1 in a first set of time resources and at least one inter-frequency radio measurement on at least one carrier frequency f2 in a second set of time resources, wherein at least one of f1 and f2 is operating under a flexible frame structure, the method comprising:

determining a priority of the inter-frequency radio measurement with respect to the intra-frequency radio measurement based on an amount of overlap between the first and the second sets of time resources, wherein determining the priority comprises determining the priority according to the following formula: the priority is equal to a first priority when the amount of overlap is below a threshold and the priority is equal to a second priority when the amount of overlap is equal to or greater than the threshold; and performing a measurement configuration using the determined priority.

17. A network node for operating in a network with a wireless device operable to perform at least one intra-frequency radio measurement on at least one carrier frequency f1 in a first set of time resources and at least one inter-frequency radio measurement on at least one carrier frequency f2 in a second set of time resources, wherein at least one of f1 and f2 is operating under a flexible frame structure, the network node comprising processing circuitry operable to:

determine a priority of the inter-frequency radio measurement with respect to the intra-frequency radio measurement based on an amount of overlap between the first and the second sets of time resources by determining a first priority when the amount of overlap is below a threshold and determining a second priority when the amount of overlap is equal to or greater than the threshold; and perform a measurement configuration using the determined priority.

18. The network node of example 17, the processing circuitry further operable to obtain an ability of the wireless device to perform the inter-frequency radio measurement with or without measurement gaps.

19. The network node of claim 17, wherein the processing circuitry is operable to determine the priority by using a first function for determining an amount of time for performing at least one of the intra-frequency measurement and the inter-frequency measurement when there is no overlap between the first and the second sets of time resources, and using a second function for determining the amount of time when the second set of time resources at least partially overlaps with the first set of time resources.

20. The network node of claim 19, wherein the processing circuitry is operable to determine the priority by using a third function for determining the amount of time when the second set of time resources completely overlaps the first set of time resources.

21. The network node of claim 17, wherein the determined priority of the inter-frequency measurement is lower than a priority of the intra-frequency measurement.

22. The network node of claim 17, wherein at least one of the first set of time resources and the second set of time resources is associated with a discovery reference signal (DRS) measurement timing configuration (DMTC) or a received signal strength indicator (RSSI) measurement timing configuration (RMTC); and
wherein the processing circuitry is operable to perform the measurement configuration by adapting at least one of the DMTC or RMTC based on the determined priority.

23. The network node of claim 17, wherein the processing circuitry is operable to perform the measurement configuration by scaling an amount of time for performing at least one of the intra-frequency and the inter-frequency measurements.

24. The network node of claim 23, wherein scaling the amount of time comprises extending an amount of time for performing a lower priority measurement.

25. The network node of claim 23, wherein scaling the amount of time comprises scaling with a different scaling factor depending on the amount of overlap between the first and second sets of time resources.

26. The network node of claim 23, wherein scaling the amount of time comprises extending the intra-frequency measurement period when there is overlap between the first and second sets of time resources and not extending the intra-frequency measurement period when there is not overlap between the first and second sets of time resources.

27. The network node of claim 17, wherein the inter-frequency measurement comprises a measurement that is performed in a measurement gap or a measurement based on discovery reference signal (DRS) measurement timing configuration (DMTC) or received signal strength indicator (RSSI) measurement timing configuration (RMTC) occasions on a secondary carrier component operating under the flexible frame structure.

* * * * *